United States Patent
Iwai et al.

(10) Patent No.: US 6,981,788 B2
(45) Date of Patent: Jan. 3, 2006

(54) LIGHTING APPARATUS FOR ENTRANCE OF VEHICLE AND LIGHTING SYSTEM FOR SAME

(75) Inventors: Shiro Iwai, Haga-machi (JP); Hidekazu Hayakawa, Takanezawa-machi (JP); Masato Endoh, Ujiie-machi (JP)

(73) Assignee: Honda Access Corporation, Saitama (JP)

( * ) Notice: Subject to any disclaimer, the term of this patent is extended or adjusted under 35 U.S.C. 154(b) by 2 days.

(21) Appl. No.: 10/863,396

(22) Filed: Jun. 9, 2004

(65) Prior Publication Data

US 2004/0252518 A1    Dec. 16, 2004

(30) Foreign Application Priority Data

Jun. 13, 2003  (JP)  ............................. 2003-170030

(51) Int. Cl.
- *B60Q 1/26* (2006.01)
- *B60Q 1/24* (2006.01)
- *B60R 1/12* (2006.01)

(52) U.S. Cl. ...................... 362/494; 362/544; 362/549; 362/235; 362/329; 362/368; 362/800

(58) Field of Classification Search ................. 362/494, 362/543, 544, 549, 235, 244, 245, 249, 329, 362/368, 800; 340/904, 901, 426.13, 426.14, 340/426.15, 426.17, 426.24, 426.35, 426.36, 340/501

See application file for complete search history.

(56) References Cited

U.S. PATENT DOCUMENTS 4,890,907 A  *  1/1990  Vu et al. ..................... 359/843

FOREIGN PATENT DOCUMENTS

| JP | 3-286077 | 12/1991 |
|----|----------|---------|
| JP | 9-48284  | 2/1997  |

* cited by examiner

*Primary Examiner*—Sandra O'Shea
*Assistant Examiner*—Sharon Payne
(74) *Attorney, Agent, or Firm*—Westerman, Hattori, Daniels & Adrian, LLP

(57) ABSTRACT

A lighting apparatus for lighting up an entrance of a vehicle, capable of decreasing the sound of wind roaring caused during driving. The lighting apparatus includes: at least one lighting element; a clear molded plastic cover member; and an attaching member for attaching the lighting element with the clear molded plastic cover member onto a bottom surface of a side mirror. The side surface of the lighting apparatus adjacent to a vehicle body is formed so as to broaden from the front of the side mirror toward the rear thereof along a direction departing from the vehicle body.

12 Claims, 6 Drawing Sheets

(a)

(b)

(c)

(a)

(b)

(c)

LIGHTING APPARATUS FOR ENTRANCE OF VEHICLE AND LIGHTING SYSTEM FOR SAME

BACKGROUND OF THE INVENTION

1. Field of the Invention

The present invention relates to a lighting apparatus and lighting system for an entrance of a vehicle, specifically for lighting up a footstep when a driver, a passenger(s) gets in/out a vehicle. Particularly, the present invention relates to a lighting apparatus and lighting system attached to a bottom surface of a side mirror.

2. Description of the Related Art

Conventionally, various kinds of lighting apparatuses attached to a vehicle body for facilitating a driver, a passenger(s) getting in/out a vehicle have been used. Moreover, a so-called "keyless entry" apparatus for locking/unlocking doors of a vehicle by a remote control key is also used in recent years. Japanese Unexamined Patent Publications No. 9-48284 and No. 3-286077 disclose lighting apparatuses which light up a road surface in response to a control from a remote control key for assisting a driver or a passenger(s) getting in and out a vehicle in a place where it is dark and a poor foothold.

Meanwhile, in order to improve riding comfort, it is required for a vehicle to, for example, decrease the sound of wind roaring caused by an airflow which occurs between a side mirror and the vehicle body during driving. Concurrently, decreasing the sound of wind roaring which occurs during driving is required when the above-explained lighting apparatus is externally attached to the vehicle.

The above-mentioned conventional lighting apparatuses disclosed by those publications, however, do not employ shapes and structures specifically designed for the reduction of the sound of the wind roaring which occurs during driving. Particularly, in a case where the lighting apparatus is attached to a conventional vehicle body as an option, the riding comfort would be impaired when the sound of the wind roaring is generated during driving due to the attachment of the lighting apparatus.

SUMMARY OF THE INVENTION

The present invention has been made to solve the above problems. It is accordingly an object of the present invention to provide a lighting apparatus and lighting system which can decrease the sound of wind roaring that occurs during driving, allowing a driver and/or a passenger(s) to make sure his/her foothold when getting on/off a vehicle.

In order to attain the above object, according to a first aspect of the present invention, there is provided a lighting apparatus employing a structure attachable to a side mirror of a vehicle and lighting up a road surface adjacent to an entrance of the vehicle when a user gets in and out the vehicle, the lighting apparatus comprising: at least one lighting element for lighting up the road surface; a clear molded (transparent) plastic cover; and an attaching member for integrally attaching the lighting element(s) and the clear molded plastic cover to a bottom surface of the side mirror, wherein a side surface of the lighting apparatus adjacent to the vehicle is formed so as to broaden from a front of the side mirror toward a rear thereof along a direction departing from the vehicle.

By employing the above-described structure, the lighting apparatus can reduce the wind speed and flow rate of the front-to-rear airflow which flows during driving into the area of a door glass in between the side mirror and the vehicle body. Accordingly, the sound of wind roaring generated by the airflow between the side mirror and the vehicle body during driving can be reduced.

In the above lighting apparatus, a bottom surface of the lighting apparatus may be defined by the clear molded plastic cover as a flat surface along a horizontal direction of the side mirror.

Moreover, the lighting element(s) may comprise a LED.

Further, the lighting element(s) may be provided such that the lighting element(s) may be inclined toward the rear of the side mirror from a vertical direction of the side mirror.

Still further, the lighting element(s) may be inclined in an inclination range of from 40 to 50 degrees.

In order to attain the above object, according to a second aspect of the present invention, there is provided a lighting system comprising: the above described lighting apparatus; a remote operation key; and a control means for controlling the lighting apparatus to light up and off in response to: a turned off condition of an engine of the vehicle; and locked/unlocked condition of a door of the vehicle, wherein the control means controls the lighting apparatus: to light up when the door of the vehicle is unlocked in the engine turned off condition; and to light off after a predetermined period elapses.

By employing the above described structure, an effective and convenient lighting system which can work with the remote operation key is provided, without impairing the riding comfort.

In the above described lighting system, the door may be unlocked by the remote control key.

Alternatively, the door may be unlocked manually.

In the above described lighting system, the lighting element(s) included in the lighting apparatus may be provided such that the lighting element(s) may be inclined toward the rear of the side mirror from a vertical direction of the side mirror.

The lighting element(s) included in said lighting apparatus may be inclined in an inclination range of from 40 to 50 degrees.

Further, the lighting element(s) may comprise a LED.

Still further, in the above described lighting system, a bottom surface of the clear molded plastic cover may be a flat surface along its horizontal direction; and a bottom surface of the lighting apparatus may be defined by the bottom surface of the clear molded plastic cover.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will now be described in detail with reference to the accompanying drawings.

Meanwhile, a word, "front" of a side mirror in this specification means a position on the front of a vehicle in its longitudinal direction in the case that a vehicle is traveling with the side mirror attached thereto, while a word, "rear" of the side mirror means a position on the rear of such vehicle in its longitudinal direction.

First, a general structure of a lighting apparatus of the invention will now be described with reference to FIG. 1.

Figure 1:
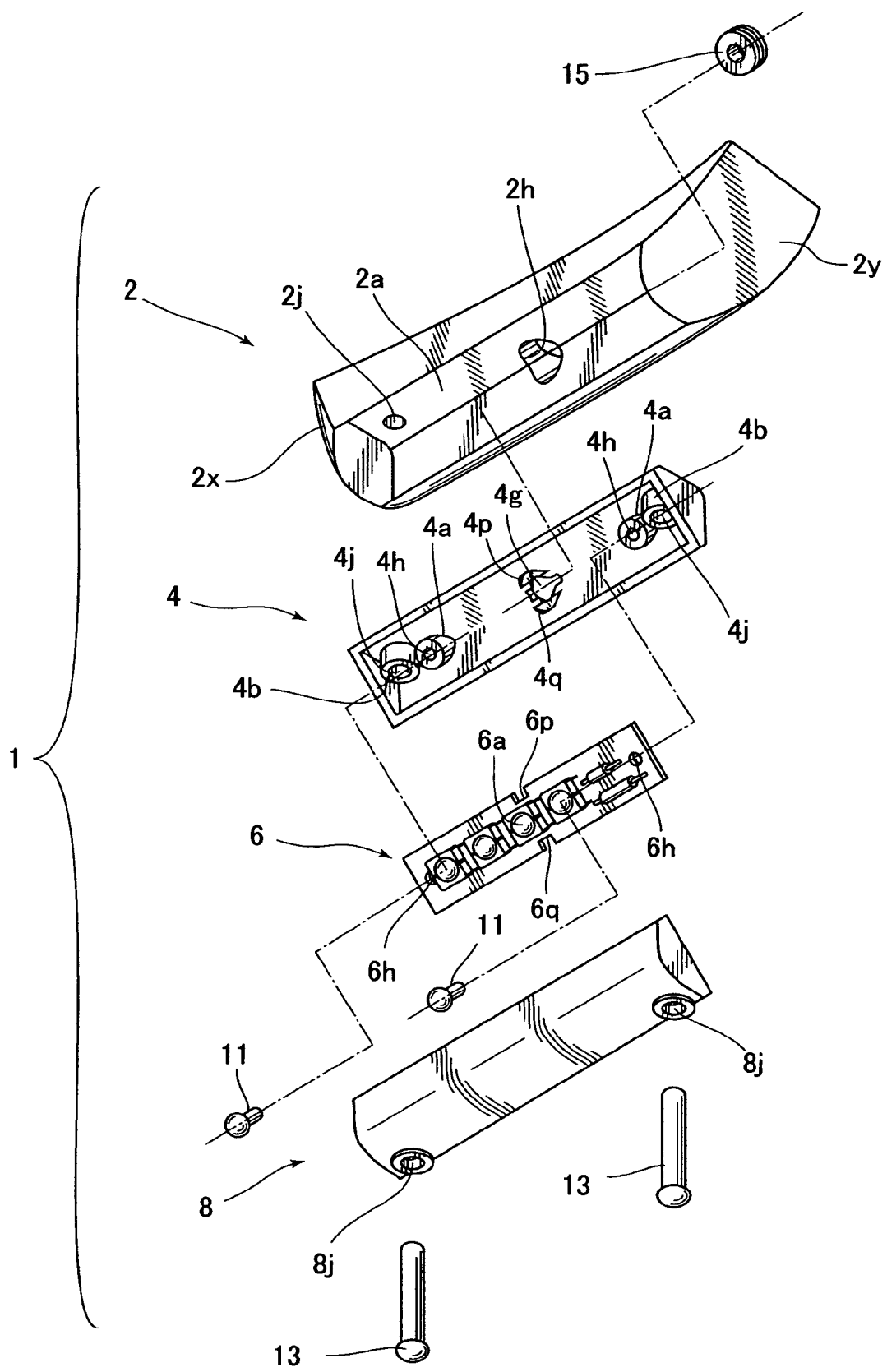
FIG. 1 is an exploded perspective view showing an attaching condition of the lighting apparatus for lighting an entrance of a vehicle according to a preferred embodiment of the present invention.

FIG. 1 is an exploded perspective view showing an attaching condition of the lighting apparatus for lighting an entrance of a vehicle.

It should be noted that whilst a lighting apparatus may be attached to a right side mirror of the vehicle is shown in FIG. 1, the lighting apparatus attached to a left side mirror, employing a symmetrical and similar structure.

As shown in FIG. 1, the lighting apparatus 1 according to this embodiment of the present invention is attached to a bottom surface of the right side mirror (not shown) of the vehicle, The lighting apparatus 1 comprises: an attaching member 2 made from an elastic body such as rubber, formed with an opening 2a for receiving a board supporting member 4 at an angle of about 45 degrees relative to the vertical direction thereof; the board supporting member 4 formed with attachment holes 4h and through-holes 4j on its ends, the attachment hole 4h and the through-hole 4j having different angles of aperture with each other; a base board 6 having a plurality of LEDs 6a (for example, four LEDs) and formed with through-holes 6h; and a clear molded plastic cover 8 formed with through-holes 8j on its ends. Screws 11 are respectively inserted into the through-holes 6h and screwed into the attachment holes 4h so that the base board 6 is fixed to the board supporting member 4, while screws 13 are respectively inserted into the through-holes 8j, 4j and the like, and screwed into tapping holes 15 which are, for example, provided on the bottom portion of the side mirror (not shown), so that the lighting apparatus 1 is mounted on the bottom surface of the side mirror such that the attaching member 2, the board supporting member 4, the base board 6 and the clear molded plastic cover 8 are integrated with one another.

Figure 2:
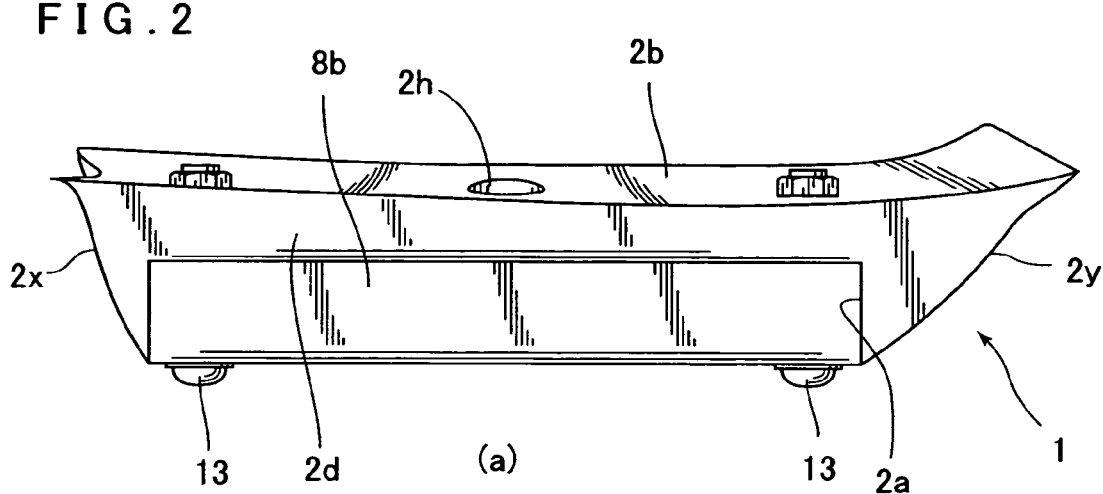
FIG. 2A is a front view of the lighting apparatus.
FIG. 2B is a longitudinal cross sectional view thereof.
FIG. 2C is a transverse cross sectional view thereof.
Figure 2:
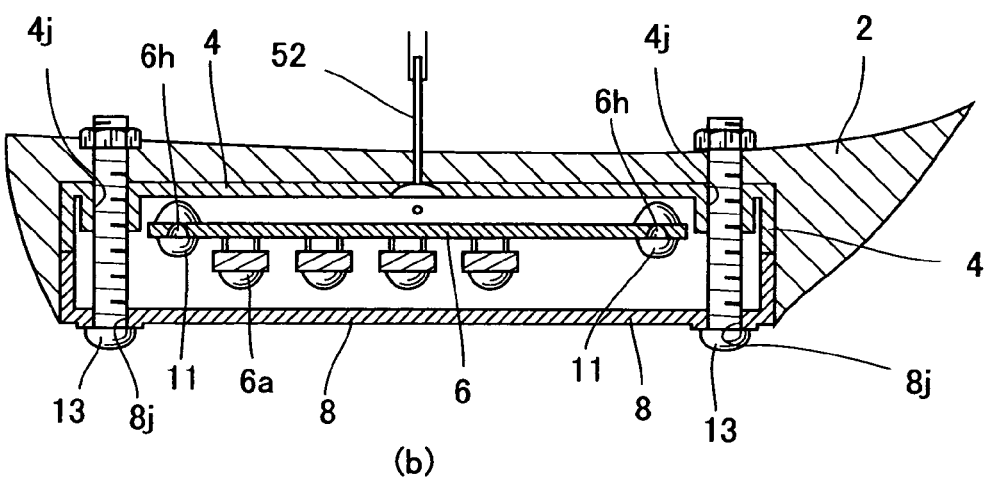
Figure 2:
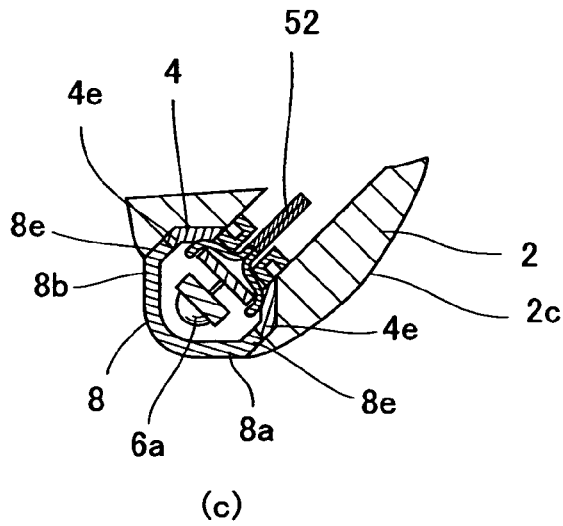
Figure 3:
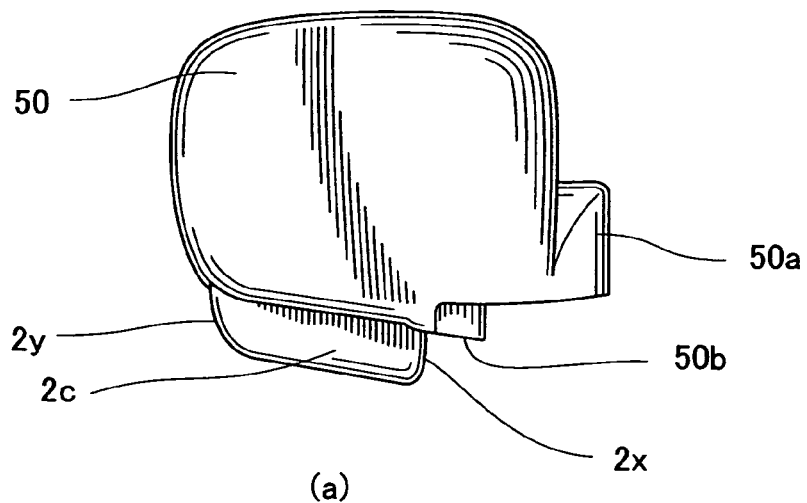
FIG. 3A is a perspective view showing a condition where the lighting apparatus 1 is mounted on the side mirror.
FIG. 3B is a bottom view.
FIG. 3C is a transverse cross sectional view, illustrating the airflow in the vicinity of the lighting apparatus.
Figure 3:
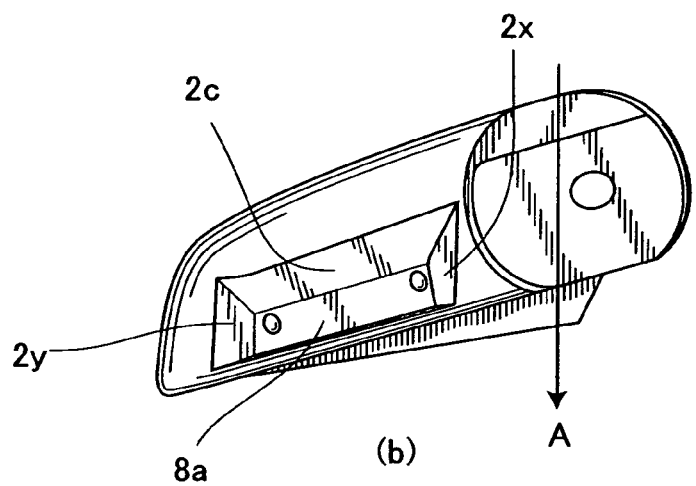
Figure 3:
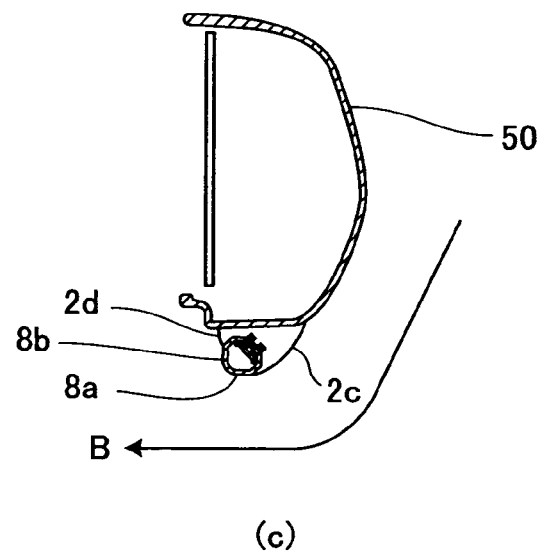

Next, details of the above-explained components will now be described with reference to FIGS. 1 to 3.

FIGS. 2A to 2C show the lighting apparatus according to this embodiment. To be more precise, FIG. 2A is a front view thereof, FIG. 2B is a longitudinal cross sectional view thereof, and FIG. 2C is a transverse cross sectional view thereof, respectively. FIG. 3A is a perspective view showing the lighting apparatus 1 mounted on the side mirror, FIG. 3B is a bottom view thereof, and FIG. 3C is a transverse cross sectional view thereof, illustrating an airflow in the vicinity of the lighting apparatus during driving.

As shown in FIGS. 1, 2A and 3A, the contour of the attaching member 2 made from an elastic body such as rubber is defined by: an attaching surface 2b along the bottom surface 50b of the side mirror 50 in the attached condition, having a through-hole 2h in its center thereof and through-holes 2j on its both ends, said through-hole 2h being for a power wire 52 to supply an electric power to the lighting elements (that is, the LEDs 6a in this embodiment), while the through-holes 2j communicating with the opening 2a; a side surface 2x locating on a neck 50a side, said neck 50a being for attaching the side mirror 50 to the vehicle body (not shown); the other side surface 2y opposite to the side surface 2x; a front surface 2c locating on the front side of the side mirror 50; a rear surface 2d locating on the rear side of the side mirror 50; and the aforesaid opening 2a receiving the board supporting member 4. The front surface 2c is formed in an inclined plane as gently inclining from the bottom surface 50b of the side mirror 50 toward the rear thereof. The opening 2a is formed in a shape for receiving the board supporting member 4 such that the LEDs 6a arranged on the base board 6 incline at an angle of about 45 degrees toward the rear of the side mirror 50 from the vertical direction thereof. As shown in FIG. 1 and FIG. 3B, the side surface 2x of the attaching member 2, which is in the aforesaid attached condition, is formed so as to broaden from the front of the side mirror 50 toward the rear thereof along a direction departing from the vehicle body.

As shown in FIG. 1, the board supporting member 4 is a hollow housing whose cross sectional surface adjacent to its center is of an essentially "letter L" shape. The board supporting member 4 is formed with a through-hole 4g adjacent to its center for the power wire 52, while a pair of engagement hooks 4p, 4q are provided adjacent to the through-hole 4g. Moreover, cylindrical protrusion members 4a are provided adjacent to the both ends of the board supporting member 4 respectively, while cylindrical protrusion members 4b are respectively provided right outside of the protrusion members 4a at different protrusion angles. The protrusion members 4a and the protrusion member 4b are respectively formed with the attachment hole 4h and the through-hole 4j, while the central axes thereof cross at about 45 degrees with each other.

On the base board 6, a plurality of the LEDs 6a are provided on the base board 6 such that the central axes of the plurality of the LEDs 6a perpendicularly intersect the surface of the base board 6. On the both ends of the base board 6, through-holes 6h are formed corresponding to the attachment holes 4h of the board supporting member 4, while notches 6p, 6q for the engagement hooks 4p, 4q are provided on the central portion of the base board 6. The base board 6 and the board supporting member 4 are integrated with each other by allowing: the engagement hooks 4p, 4q of the board supporting member 4 to engage the notches 6q, 6p of the base board 6 respectively; and the screws 11 to be inserted through the through-holes 6h and screwed into the attachment holes 4h. As shown in FIGS. 1 and 2C, the LEDs 6a provided on the base board 6 are inclined at an angle of about 45 degrees from the vertical direction of the side mirror 50 toward the rear thereof in an attached condition since the LEDs 6a are fixed by screws 11 to the attachment holes 4h which have central axes crossing those of the through-holes 4j at an angle of about 45 degrees.

Meanwhile, the inclination angle can vary from, for example, 30 to 60 degrees, preferably 40 to 50 degrees, depending on the size, shape, etc, of the vehicle to which the lighting apparatus 1 is attached, so as to obtain an effective range of exposure. The effective range of exposure will be explained in more detail later.

Figure 4:
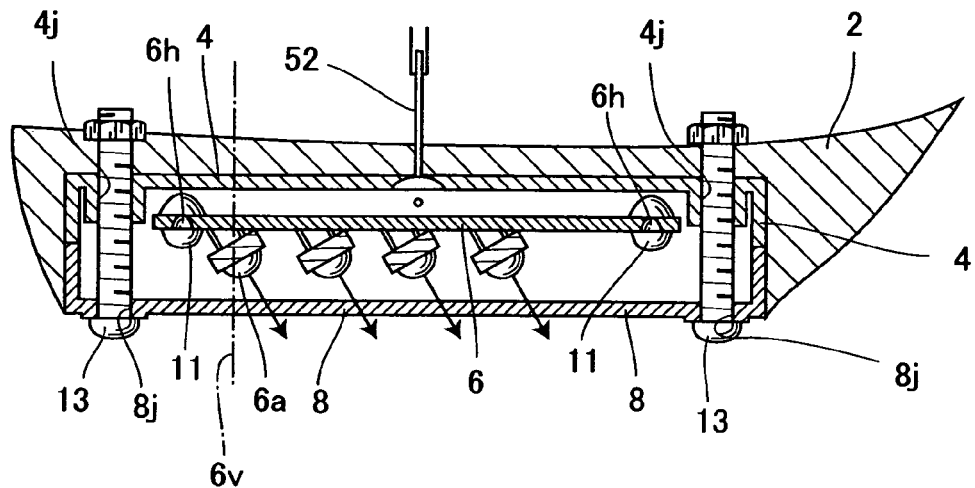
FIG. 4 is a view showing a base board of the lighting apparatus with a plurality of LEDs mounted so as to incline relative to the base board according to an another embodiment of the present invention.

Further, according to an another embodiment shown in FIG. 4, the plurality of the LEDs 6a may be provided on the base board 6 so as to incline outwardly of the vehicle at an angle of 10 to 30 degrees from the vertical axis 6v of the surface of the base board 6. By attaching the plurality of the LEDs 6a to the base board 6 with this inclination, the effective range of exposure can be further extended toward the outside of the vehicle.

The clear molded plastic cover 8 is formed in a hollow shape of an essentially "letter L" profile, and symmetrical to the board supporting member 4. The clear molded plastic cover 8 is formed with through-holes 8j on its both ends 8e, corresponding to the through-holes 4j of the board supporting member 4. As shown in FIG. 1 and FIG. 2B, 2C, by inserting screws 13 into the through-holes 8j, 4j and 2j respectively and screwing the screws 13 into the tapping holes 15 provided on the bottom surface 50b of the side mirror 50, the both ends 8e of the clear molded plastic cover 8 come in contact with both ends 4e of the board supporting member 4 and attached thereonto, while the board supporting member 4 being attached to the attaching member 2 at an angle of 45 degrees. Accordingly, in the attached condition, a bottom surface 8a of the clear molded plastic cover 8 defines the horizontally flat bottom surface of the lighting apparatus 1, while side surfaces 8b of the clear molded plastic cover 8 define the side surfaces of the lighting apparatus 1 which extend substantially perpendicularly to the bottom surface of the lighting apparatus 1.

In the lighting apparatus 1 employing the above-explained structure, since the side surface 2X of the attaching member 2 is formed so as to broaden in the direction departing from the vehicle body from the front of the side mirror 50 toward the rear thereof as shown in FIG. 3B, an airflow during driving along an arrow A from the front of the side mirror 50 to the rear thereof is dissipated along the contour of the side surface 2X. Accordingly, the amount of the airflow toward the area of a door glass can be decreased, and thus the sound of wind roaring which occurs during driving generated by the airflow between the side mirror 50 and the vehicle body can be reduced.

Moreover, as shown in FIG. 3C, since the horizontally flat bottom surface 8a of the clear molded plastic cover 8 integrated with the attaching member 2 defines the flat and horizontal bottom surface of the lighting apparatus 1, a turbulence of an airflow which occurs during driving along an arrow B from the front of the side mirror 50 to the rear thereof can be prevented, and thus the airflow can smoothly flow toward the rear of the side mirror 50. Therefore, the airflow during driving is not blocked, while the sound of wind roaring can be reduced as a result.

Further, since the plurality of LEDs 6a and the base board 6 are inclined at an angle of about 45 degrees from the vertical direction of the side mirror 50 toward the rear thereof, the dimension of the lighting apparatus 1 along its height can be downsized. Accordingly, air resistance against the airflow can be decreased, and thus the airflow during driving is not blocked. Therefore, the sound of wind roaring can be reduced.

Figure 5:
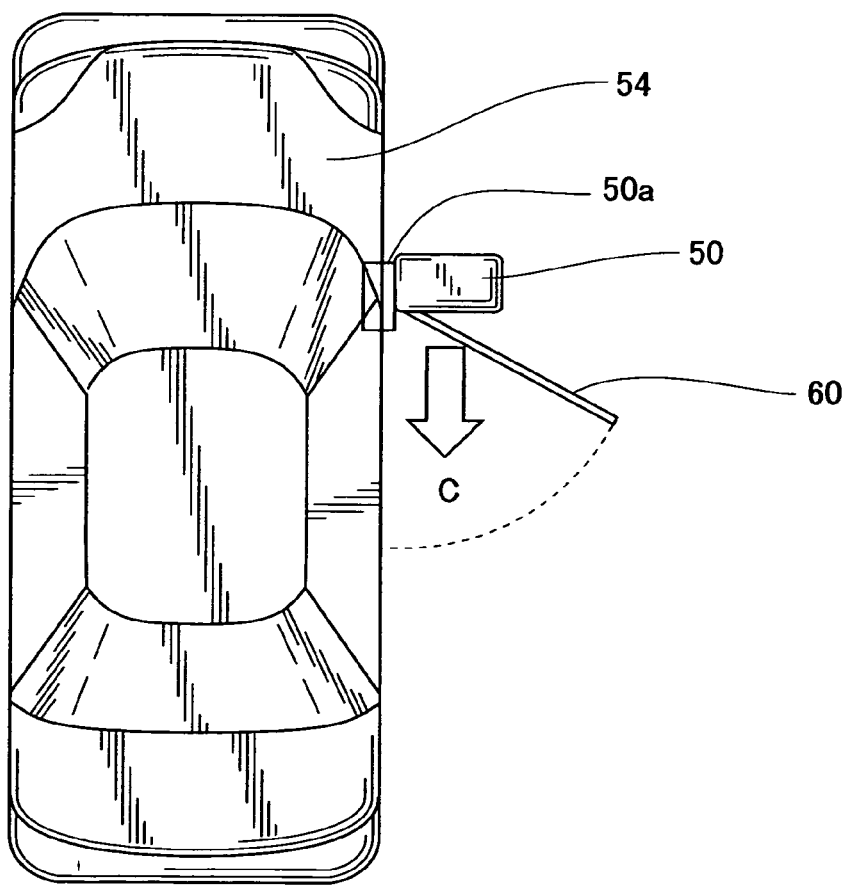
FIG. 5 is a view for explaining an appropriate exposure area by the lighting apparatus according to the preferred embodiment of the present invention.

Still further, since the plurality of LEDs 6a are provided on the bottom surface 50b of the side mirror 50 at an angle of about 45 degree, the effective range of exposure along a direction denoted by an arrow C in FIG. 5 can be obtained with appropriate height. Namely, in a case where the lighting apparatus 1 is attached to the bottom portion of the chassis of the vehicle body 54 adjacent to a road surface, there would be a problem that the lighting intensity of the lighting apparatus 1 is decreased due to adhesion of snow, dirt or the like during driving. On the other hand, in a case where the lighting apparatus 1 is provided on a portion of the vehicle 54 above the side mirror 50, there would be another problem such that the lighting apparatus 1 needs to be projected toward the width direction of the vehicle 54 in order to light up the road surface around the door 60. According to this embodiment of the present invention, however, those problems do not arise since the lighting apparatus 1 is provided on the bottom surface 50b of the side mirror 50, being inclined in the above-mentioned manner.

Moreover, by using the LEDs 6a as the lighting elements, replacement of the lighting elements is essentially not necessary as compared to a case using bulb-type lamps as the lighting elements, while the amount of heat released from the LEDs 6a is also less, and thus the lighting apparatus 1 can be made compact.

Next, an embodiment of a lighting system with the lighting apparatus 1 and a so-called remote operation key will now be described with reference to FIGS. 6 and 7.

Figure 6:
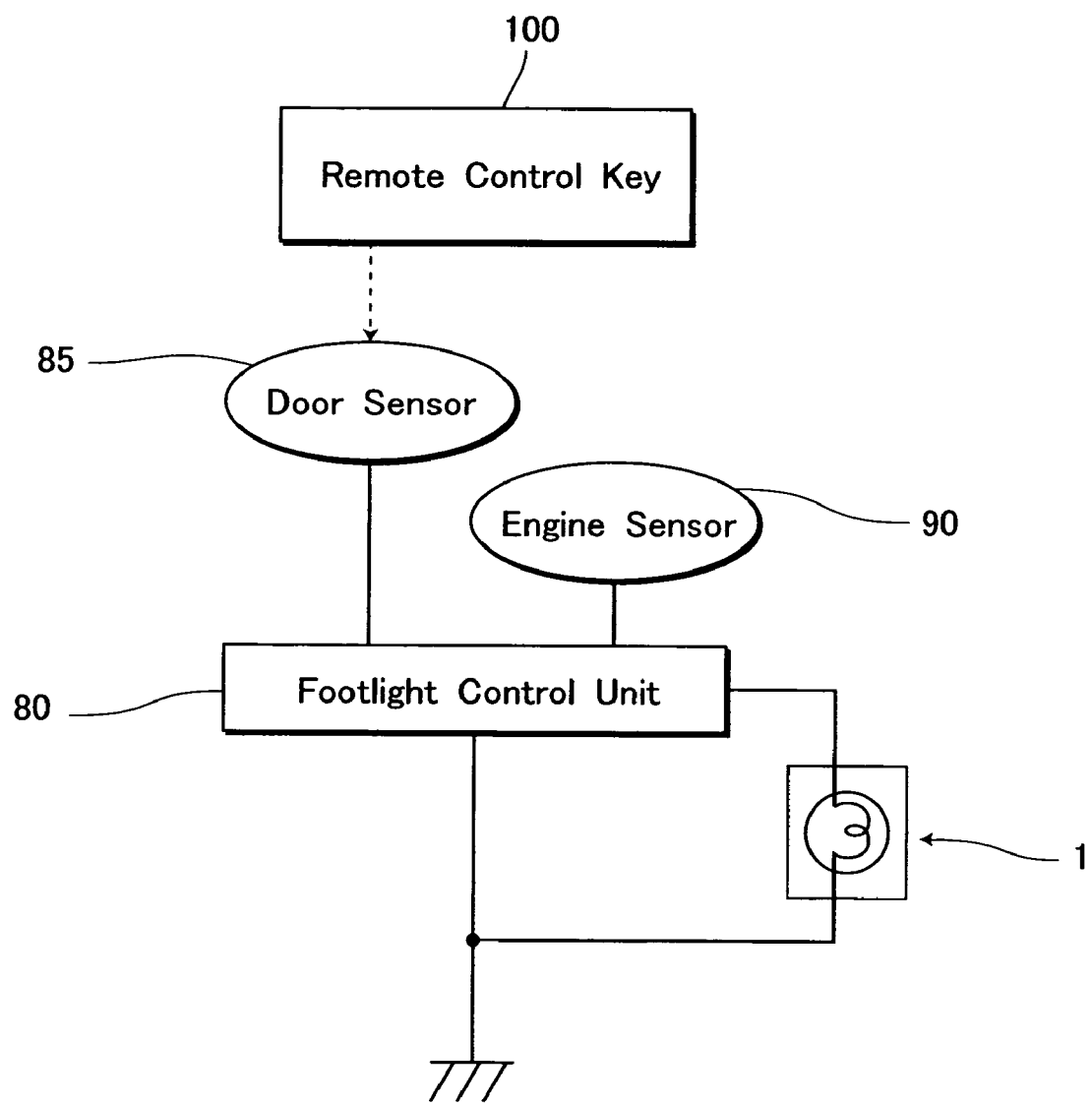
FIG. 6 is a block diagram showing a schematic functional structure of the lighting system.
Figure 7:
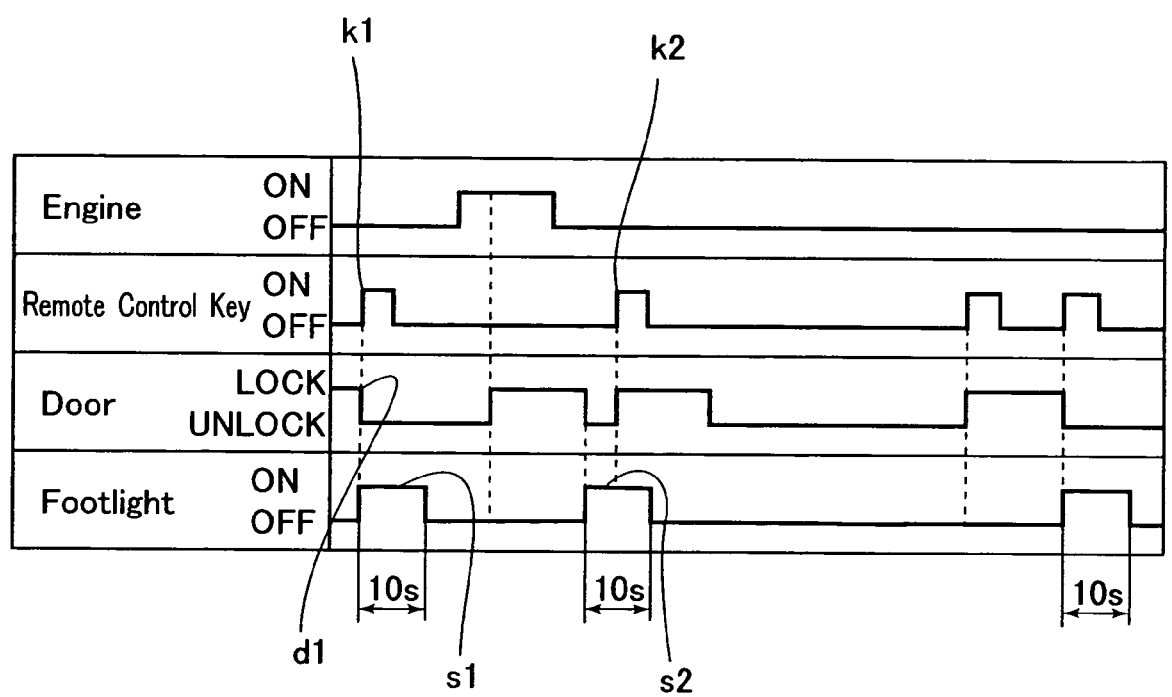
FIG. 7 is a time chart for explaining the operation of the lighting system, where the lighting apparatus is combined with the remote operation key.

Meanwhile, FIG. 6 is a block diagram showing a schematic functional structure of the lighting system, while FIG. 7 is a time chart for explaining the operation of the lighting system.

As shown in FIG. 6, a lighting control unit 80 functioning as a control means controls turning on/off (lighting on/off) the lighting apparatus 1 in response to outputs of door sensors 85 and engine sensor 90. Each of the door sensors 85 detects locked/unlocked condition of a door 60, while the engine sensor 90 detects a condition of an engine. To be more precise, each of the door sensors 85 changes its outputs in response to the locked/unlocked condition of the door 60 based on operational signals of the remote operation key 100 or manual operations, while the engine sensor 90 changes its output in response to the turning on/off condition of the engine. The control unit 80 as the control means can be embodied by modifying an existing interior light control unit controlling an interior light.

As shown in FIG. 7, in a case where the door 60 is unlocked (d1) by a release signal (k1) from the remote operation key 100 when the engine is turned off and a driver/passenger(s) gets in the vehicle, the lighting apparatus 1 starts lighting up. Then, the lighting apparatus 1 keeps lighting for a predetermined period (for example, 10 seconds), and automatically lights off (s1). Meanwhile, even when a lock signal is outputted from the remote operation key 100 (k2) during the predetermined period, the lighting apparatus 1 keeps lighting up (s2) for the predetermined period.

More specifically, the control unit 80 allows the lighting apparatus 1 to light up when the door 60 is unlocked by the manual operation or the remote operation key 100 in a condition where the engine is turned off. When the predetermined period elapses, the control unit 80 allows the lighting apparatus 1 to light off.

By employing the above-explained structure, unnecessary lighting hours can be shortened, while the effective, convenient lighting system capable of reducing the sound of wind roaring and improving the riding comfort can be provided.

Meanwhile, in order for the system to further cooperate with driving operations, the lighting system may employ a structure such that it has sensors detecting the insertion of the key 100 into key holes and outputting a signal to the control unit 80, while the control unit 80 may allow the lighting apparatus 1 to light off when the key 100 is inserted into the ignition key hole.

In a more preferable form of the invention, the aforesaid side surface 2x of the attaching member 2 may be broadened from the front toward the rear of the side mirror 50 along the direction departing from the vehicle in such a manner that a distance between the side surface 2x and an adjacent side surface of the vehicle body is increased not only from the front toward the rear but also downwardly from the bottom surface 50b. By enlarging an airflow passage between the side surface 2x and the side surface of the vehicle body from the front toward the rear thus way, the wind speed and flow rate of the airflow flowing into the door glass area of the vehicle can be remarkably decreased.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention within the claims are to be regarded to be in the scope of the present invention.

For example, the predetermined period of the lighting apparatus 1 for lighting up may be set appropriately.

What is claimed is:

1. A lighting apparatus for an entrance of a vehicle, employing a structure attachable to a side mirror of the vehicle and lighting up a road surface adjacent to the entrance of the vehicle when a user gets in and out the vehicle, the lighting apparatus comprising:
    at least one lighting element for lighting up the road surface;
    a clear molded plastic cover; and
    an attaching member for integrally attaching said lighting element and said clear molded plastic cover onto a bottom surface of the side mirror,
    wherein a side surface of the lighting apparatus adjacent to the vehicle is formed so as to broaden from a front of the side mirror toward a rear thereof along a direction departing from the vehicle.

2. The lighting apparatus according to claim 1, wherein a bottom surface of the lighting apparatus is defined by said clear molded plastic cover as a horizontally flat surface.

3. The lighting apparatus according to claim 1, wherein said lighting element comprises an LED.

4. The lighting apparatus according to claim 1, wherein each lighting element is provided such that it is inclined toward the rear of the side mirror from a vertical direction thereof.

5. The lighting apparatus according to claim 4, wherein each lighting element is inclined in an inclination range of from 40 to 50 degrees.

6. A lighting system for an entrance of a vehicle, comprising:
    said lighting apparatus of claim 1;
    a remote operation key; and
    a control means for controlling said lighting apparatus to light up and off in response to: a turned off condition of an engine of said vehicle; and a locked/unlocked condition of a door of said vehicle,
        wherein said control means controls the lighting apparatus:
        to light up when the door of said vehicle is unlocked in the engine turned off condition; and
        to light off after a predetermined period elapses.

7. The lighting system according to claim 6, wherein the door is unlocked by said remote control key.

8. The lighting system according to claim 6, wherein the door is unlocked manually.

9. The lighting system according to claim 6, wherein each lighting element included in said lighting apparatus is provided such that it is inclined toward the rear of the side mirror from a vertical direction thereof.

10. The lighting system according to claim 9, wherein each lighting element included in said lighting apparatus is inclined in an inclination range of from 40 to 50 degrees.

11. The lighting system according to claim 10, wherein the lighting element comprises an LED.

12. The lighting system according to claim 6, wherein:
    a bottom surface of said clear molded plastic cover is a flat surface extending in a horizontal direction; and
    a bottom surface of said lighting apparatus is defined by the bottom surface of said clear molded plastic cover.

* * * * *